United States Patent [19]

Iuchi

[11] Patent Number: 4,917,166
[45] Date of Patent: Apr. 17, 1990

[54] PNEUMATIC RADIAL TIRE HAVING AN IMPROVED DURABILITY IN BEAD SECTION

[75] Inventor: Munenori Iuchi, Tokyo, Japan

[73] Assignee: Sumitomo Rubber Industries, Ltd., Japan

[21] Appl. No.: 249,193

[22] Filed: Sep. 26, 1988

Related U.S. Application Data

[63] Continuation of Ser. No. 917,301, Oct. 9, 1986, abandoned, which is a continuation of Ser. No. 665,537, Oct. 26, 1984, abandoned.

[30] Foreign Application Priority Data

Oct. 28, 1983 [JP] Japan ................................ 58-203136

[51] Int. Cl.$^4$ ............................................. B60C 15/06
[52] U.S. Cl. .................... 152/554; 152/541; 152/543; 152/546; 152/547
[58] Field of Search ............... 152/541, 543, 546, 547, 152/542, 554, 555

[56] References Cited

U.S. PATENT DOCUMENTS

| | | | |
|---|---|---|---|
| 3,964,533 | 6/1976 | Arimura et al. ............... | 152/362 CS |
| 4,046,183 | 9/1977 | Takahashi et al. ............. | 152/546 X |
| 4,086,948 | 5/1978 | Suzuki et al. .................... | 152/546 X |
| 4,120,338 | 10/1978 | Mirtain .............................. | 152/374 |
| 4,185,677 | 1/1980 | Motomura et al. ............. | 152/362 R |
| 4,212,340 | 7/1980 | Van Der Burg et al. ...... | 152/362 R |
| 4,495,976 | 1/1985 | Makino et al. ................. | 152/362 CS |

FOREIGN PATENT DOCUMENTS 56-25006 3/1981 Japan .............................. 152/362 R Primary Examiner—Raymond Hoch
Attorney, Agent, or Firm—Stevens, Davis, Miller & Mosher

[57] ABSTRACT

A reinforced radial tire bead construction for heavy load vehicles, such as trucks and buses, which has excellent durability and recapability. The tire has a carcass ply turnup wrapped around a bead core and a relatively soft rubber apex strip. A steel cord reinforcing layer surrounds part of the turnup and a layer of organic fiber cords is outside the steel cord layer and extending to a greater radial height. Between the turnup ends and the inner surface of the organic cord layer is a rubber strip of relatively soft material. Between the carcass ply main portion and the soft rubber apex strip is a rubber band of relatively harder material.

5 Claims, 3 Drawing Sheets

PNEUMATIC RADIAL TIRE HAVING AN IMPROVED DURABILITY IN BEAD SECTION

This application is a continuation of application Ser. No. 917,301, filed Oct. 9, 1986, now abandoned, which in turn is a continuation, of application Ser. No. 665,537, filed Oct. 26, 1984, now abandoned.

BACKGROUND OF THE INVENTION

1. Field of the Invention

The present invention relates to pneumatic tires of radial construction provided with a carcass ply composed of steel cords and, more particularly, to an improved structure for reinforcing bead sections of large size radial tires for heavy vehicles, such as trucks.

2. Description of the Prior Art

Heretofore, in general, radial tires provided with a carcass ply composed of radially directed steel cords, and semi-radial tires wherein a carcass ply forms a small angle in the range of 15°–30° with respect to a radial direction of the tire, have fairly low rigidity in their bead sections when compared with that of bias ply tires, and this low rigidity in the bead section is largely to contribute to the improvement of riding comfort of radial tires. However, on the other hand, weak resistance to the lateral force against the tire, and hence a large deformation, is to invite a structural failure in the bead section within a short running period under severe service conditions.

In order to solve this technical problem which is peculiar to radial tires, various kinds of reinforcing structures of the bead section have previously been proposed.

For instance, the art which is disclosed in Japanese Patent No. 967,452 is well known to be one of outstanding reinforcing structure in the bead section. This patent, as shown in FIG. 2, is characterized in that the reinforcing layer 4, comprised of steel cords, is disposed at the outside of the turnup portion 2' of the carcass ply 2 and reinforcing layers 6, comprised of rubberized organic fiber cords wherein two or more layers are crossed with each other, are arranged at the outside of the aforesaid steel cord reinforcing layer 4 and extend radially upwardly from the bead base to the sidewall region. The rubber layers 11,12 are disposed between the carcass ply main portion 2 and the turnup portion 2' of the carcass ply 2 and extend outwardly radially from the bead core 3 and decrease in thickness towards the sidewall of the tire to form a substantially triangular section, which consists of a stiffener 11 of a hard rubber stock with a JIS (Japanese Industrial Standards) hardness of more than 80°, in a side of the carcass ply main portion and a buffer 12, composed of a relatively soft rubber stock with a JIS hardness of 50–60, in a side of the turnup portion 2' of a carcass ply 2 and extending along the organic fiber cord reinforcing layers 6 outwardly in a radial direction of the tire.

The tire constructed as above-described in FIG. 2 has been favorably accepted by drivers as the tire in which the bead durability is broadly improved, but recently some drivers have begun to use such tires under more even severe service condition, namely, such as running at high speed and a long period of running under heavy loads and high inflation pressure. Together with the increased use of radial tires under special heavy loads and high inflation pressure, has also come more frequent recapping in order to substantially reduce the cost of tires. It has become a tendency to recap a worn tire two or three times. Under such circumstances, the above-mentioned structure is insufficient for the requirement of durability of the bead portion, which is vital to preserve a worn tire for recapping. The above-described technical problem is one which the present invention seeks to remove.

SUMMARY OF THE INVENTION

An object of the present invention is to provide pneumatic radial tires, especially large size radial truck tires, having an improved bead portion reinforced construction which can effectively eliminate the difficult problem which has been encountered with prior art techniques, i.e., which are resistant in use under increasingly severe service conditions and which can be recapped two or three times without damaging the base tire.

DETAILED DESCRIPTION OF THE INVENTION

Radial and semi-radial tires have a carcass ply composed of radially directed cords. As a result, the sidewall of the radial tire is extremely soft and hence its flexure in a plane parallel to the rotary axis of the tire is very large. Thus, the amount of deformation of the tire during tire revolution is far larger than that of a bias ply tire.

Figure 2:
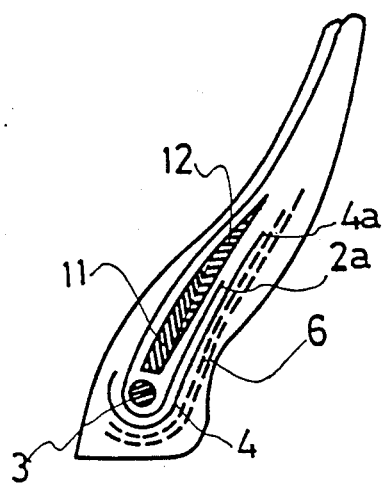
FIG. 2 is a cross-sectional view of a bead section of a prior invention with the aforesaid reinforcing construction.
Figure 3:
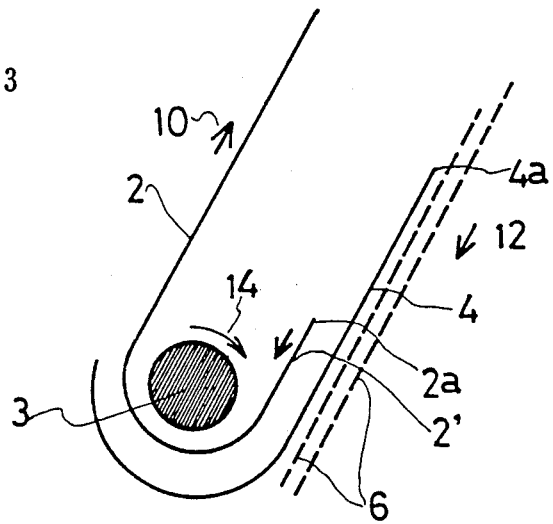
FIG. 3 is a schematic view illustrating the dislocating direction of reinforcing components in a bead section when the radial tire shown in FIG. 2 is inflated to the maximum extent.

When a tire with the bead section shown in FIG. 2 is inflated, the behavior of the deformation of the carcass ply may be explained in FIG. 3 as follows. A carcass ply 2 turned up around a bead core 3 moves upwardly, as shown by arrow 10. On the other hand, turnup portion 2' of the carcass ply 2 on the outside of the bead core 3 moves downwardly, as shown by arrow 12, thus tending to force the carcass ply 2 to pull throughout the bead core 3, that is, the phenomenon of "ply blowout" occurs in the bead portions.

The turnup portion 2' of the carcass ply 2 causes the steel cord reinforcing layer 4 and the organic fiber cord reinforcing layers 6,6 to move downwardly.

The bead core 3 likewise tends to rotate about its own axis, as shown by arrow 14. In addition, the deformation of the tire when it is inflated causes a shearing strain in a radial direction to be produced among the carcass ply main portion 2 and its turnup portion 2', the steel cord reinforcing layer 4 and the organic fiber cord reinforcing layers 6.

Then, taking into consideration the dynamic strain caused during one rotation of the tire under load, the amount of lateral deformation of the tire on the contact area with the road is very much larger than in any other part of the tire. That is, the bead section is strongly forced to deform over the rim flange by overhanging the rim flange under the influence of flexure of the normally convex surface of the sidewall in a direction generally parallel to the rotary axis of the tire. Thus, the cord path (the space between two adjacent cords) of the carcass ply is forced to extend and, accompanying this movement, the turnup portion of the carcass play and the steel cord reinforcing layer are strongly forced to deform towards the outside in the direction of the rotary axis of the tire. Furthermore, this movement is repeated during the rotation of the tire, thus the temperature of the bead section increases. In addition to the above-mentioned increase of the temperature by internal energy loss, the transmission of heat energy from the brake drum of a vehicle, it was found by the inventors that the temperature of a rim flange increases up to 150°–170° C. in the tire with a tubed tire rim and to 125°–140° C. in a tubeless tire with a 15° tapered rim.

In comparison with the temperature of the rim flange, the temperature of the bead section increases even more and the stress concentration on the steel cord ends is further accelerated by the discontinuity of rigidity near the radially outer end of the steel reinforcing layer, which has very high rigidity in the flexible sidewall portion so that when the tire is deformed under load, peeling of the steel cord may occur at the discontinuous area of rigidity.

Thus, the bead sections suffer from dynamic fatigue and thermal fatigue. Furthermore, the adhesion of the rubber to steel cords or fiber cords, which is vital to the maintenance of tire performance, is exclusively dependent upon avoiding the effects of dynamic and thermal fatigue. When the internal temperature of the tire increases above a certain level, the tire will be quickly broken down by sudden lowering of the adhesion among these components and a separation failure of the steel cord ends.

Accordingly, it is an object of this invention, and essential for the progress of tire durability, to establish techniques which can control the internal temperature of a tire to a low level and which can maintain the adhesion at a high level, which is not so dependent upon the internal temperature.

To eliminate the above disadvantages, the art of bead portion reinforcing construction, which is disclosed in applicants' previously-mentioned Japanese Patent No. 967,452 utilizes at least two organic textile layers composed of Nylon or a wholly aromatic polyamide, such as Kevlar cord, axially outside the position corresponding to the radially outer end of the steel reinforcing layer to mitigate the stress concentration at the above-mentioned steel cord ends. But the volume of the bead portion is increased by such additions, and the temperature of the bead portions is thus further increased under high load.

An object of the invention is to provide a pneumatic radial tire having an improved bead portion reinforcing construction, which can effectively prevent the failure due to the stress concentration by the discontinuity of the rigidity in the bead portion and the temperature increase. Namely, the separation failure of the steel cord ends of the reinforcing layer and the carcass play, which is a serious weak point in present radial tires.

According to the invention, the feature of preventing the separation failure liable to be caused at the end of the steel cord is achieved by arranging a "Rubber Band HB" with a high elasticity in the axially outer portion of the carcass ply main portion to protect the carcass ply from enlarging the cord path (space), which promotes the above-mentioned "ply blowout" phenomenon, and by making the bead apex of the single rubber layer of low modulus and low histeresis compounds to control the generation of inner temperature in the bead portions, and arranging "strip rubber PF" at the cord ends of the steel reinforcing layer.

The present invention provides a pneumatic radial-type tire having an improved durability in the bead section, comprising at least one carcass ply 2 of radial or semi-radial construction composed of steel cords arranged at an angle of 90°–60° range with respect to the mid-circumferential plane of the tire and both ends of the carcass ply 2 are turned up around each bead core 3, respectively, from the axially inner side toward the axially outer side of the bead portion. The bead reinforcing layer 4 comprises at least one rubberized steel cord layer arranged along and adjacent to the turnup portion 2' of the carcass ply 2, and the vertical height $h_2$ of the outermost end $4a$ of the bead reinforcing layer 4 in the radial direction from the bead base portion is located at a position within the range of $(0.9 \text{ to } 0.5)h_1$, where $h_1$ is the height of the upper end of the turnup portion 2' of the carcass ply 2, and is located higher than the flange height and reinforcing layer 6, which comprises rubberized organic fiber cords wherein two or more layers are crossed with each other, are arranged at the outside of the aforesaid steel cord layer 4 with respect to the axial direction of the tire and extend downwardly along the steel cord layer from height $h_3$ at its upper end $6a$, which is 1.3–2.5 times as high as the height $h_1$ of the upper end $2a$ of the turnup portion 2' of the carcass ply 2, as measured from the inside of the bead portion with respect to the axial direction of the tire. The upward cut ends of the turnup portion of the carcass ply and of the steel cord layer are completely covered with this organic fiber cord reinforcing layer 6.

The strip rubber PF, which has a low 100% modulus of elasticity of 30–80 kg/cm² and a thickness of 0.3–5 mm at the end of the turnup portion of the carcass ply, is disposed between the organic fiber cord reinforcinng layer 6 and the turnup portion 2' of the carcass ply. Strip PF has no steel cord reinforcing layer and the apex rubber SE is composed of soft rubber with a 100% modulus of elasticity of 10–45 kg/cm² and JIS hardness of 45°–65°. The soft apex rubber is disposed between the carcass ply main portion and the turnup portion 2' of the carcass ply 2 (which has a steel cord reinforcing layer) and the rubberized organic fiber cord reinforcing layers 6 and extends outwardly from above the bead core to beyond the outermost cord ends of the turnup portions, and also radially beyond the steel cord reinforcing layer. It gradually decreases in thickness towards the sidewall of the tire to form a substantially triangular section. This rubber layer is preferably formed of one integral rubber piece.

The present invention will be explained in more detail with reference to the drawings.

Figure 4:
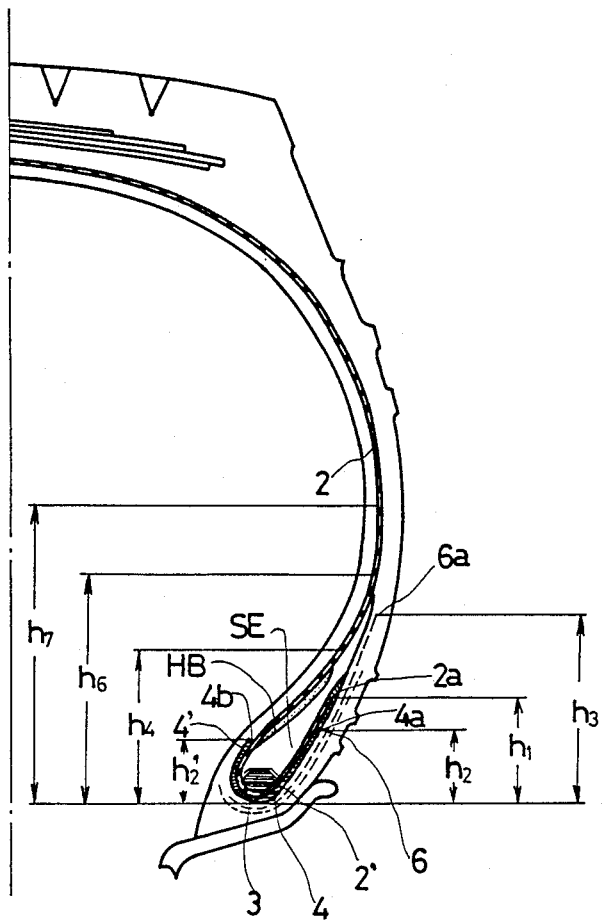
FIG. 4 is a half cutaway view of one embodiment of a radial tire according to the present invention.
Figure 5:
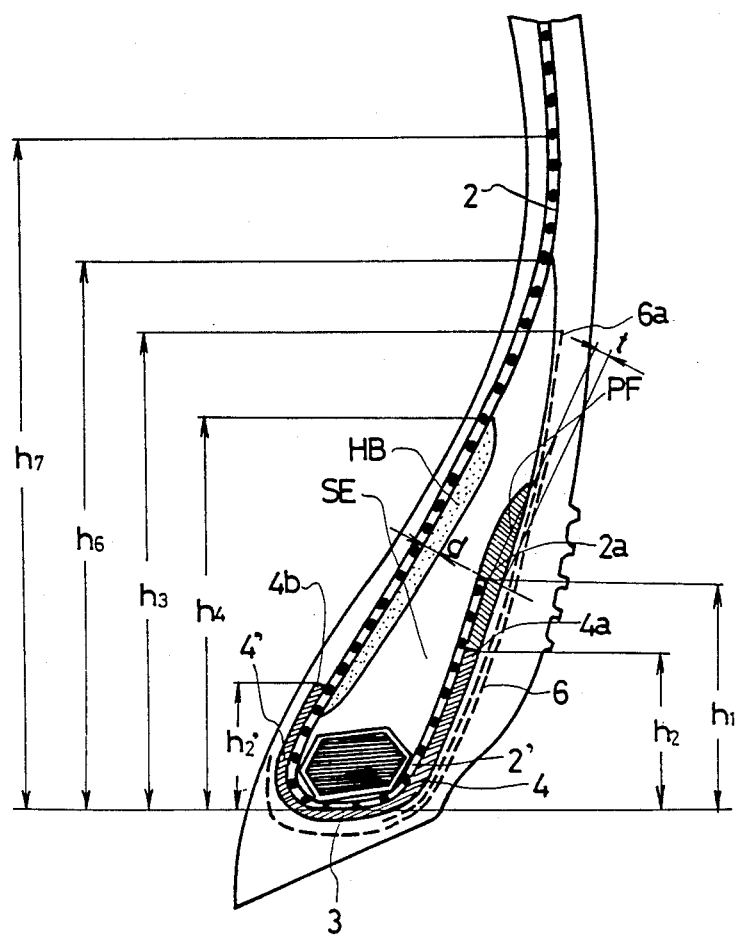
FIG. 5 is an enlarged view of the bead portion of the tire shown in FIG. 4.

In FIG. 4 is shown, in section, the right-half of one embodiment of a radial tire according to the invention. FIG. 5 shows the bead portion thereof on an enlarged scale.

Referring to FIGS. 4 and 5, the carcass ply 2 is composed of radially directed steel cords extending from one of bead cores 3 to the other bead core, and wrapped around each bead core 3 from the inside to the outside thereof and secured thereto. A steel cord reinforcing layer 4, composed of the same steel cord as the carcass ply cord, is arranged along and adjacent to the axially outside of the turnup portion 2' of the carcass ply 2 from the height $h_2$ of its upper end 4a of 0.9–0.5 times as high as the height $h_1$ of the upper end 2a of the turnup portion 2' to the height $h_2'$ of its inward wound-up portion 4' around the bead core 3 at the axial inside of the bead core at a height of 0.3–0.8 times as high as the turnup height of the carcass ply. The organic fiber cord reinforcing layers 6, composed of rubberized cords, like Nylon, etc., are arranged with at least two layers along and adjacent to the axially outside of the above-mentioned steel cord reinforcing layer and extend toward the maximum width at $h_7$ of the tire section from the bead base portion to the height $h_3$ of its upper end 6a.

The soft apex rubber SE, which has a lower hardness than the carcass ply coating rubber, is interposed between the carcass ply main portion 2 and the turnup portion 2' of the carcass ply 2 and extends radially outwardly from the bead core. This soft rubber apex is substantially triangular in cross-sectional shape, and is of circular circumferential shape, composed of preferably a single rubber stock and disposed at a radial range between the bead core and the height $h_6$, which is slightly lower than the height at which a sectional width of the tire is at a maximum.

A hard rubber band HB, having a thickness of d and at least the same hardness as the coating rubber on the carcass ply, is interposed between the carcass ply main portion 2 and soft apex SE and along and adjacent to the carcass ply. It has strong adhesion and extends from about the height $h_2'$ of the upper end of the turnup portion 4' to the height $h_4$, which is 1.5–3.0 times as high as the height $h_1$. Furthermore, the ply-filler edge strip rubber (hereafter called the PF strip), which is bat-jointed with the upper end 4a of the steel cord reinforcing layer 4, is arranged to extend above and below the upper end 2a of the turnup and to be wrapped among the organic fiber cord reinforcing layer 6, soft apex rubber SE and the turnup portion 2' of the carcass ply 2. The PF strip is strongly adhered to the abovesaid components around it. In Table 1 is shown the specification of radial tires having the above-described bead structures, according to the present invention, in tire size of 10.00R20 14PR. and 12R22.5 14PR., which were compared with similar conventional tires disclosed in previously-mentioned Japanese Patent No. 967,452, and having the specification shown in Table 2 in the bead endurance performance test.

In the comparison test, a sample tire was driven under a constant work load (load×speed) kg·km/h and a stipulated maximum internal pressure on a drum running tester, which has a smooth surface and a diameter of 1.7 m and was kept at room temperature, and an endurance performance test tire was evaluated by the running hours until ply blowout failure occurred in the bead portion. The obtained test results are shown in the following Table 3 by an index number.

This test result shows that the durability of the tire according to the invention can be improved more than about 200% relative to the comparative conventional tire.

TABLE 1
(Present Invention)

| Structure | Tire Size 10.00R20 14 PR. Tube Tire (mm) | 12R22.5 14 PR. Tubeless Tire (mm) |
|---|---|---|
| Height $h_7$ at the tire portion of maximum width | 137 | 114 |
| Height of upper end of turnup portion of ply $h_1$ | 68 | 40 |
| Height of metal cord reinforcement layer $h_2$ | 57 | 30 |
| Height of metal cord reinforcement layer $h_2'$ | 53 | 24 |
| 100% modulus | 50 kg/cm$^2$ | 50 kg/cm$^2$ |
| JIS hardness | 70° | 70° |
| Height of fiber cord reinforcement layer $h_3$ | 90 | 80 |
| 100% modulus | 50 kg/cm$^2$ | 50 kg/cm$^2$ |
| Height of soft apex rubber $h_6$ | 120 | 100 |
| 100% modulus | 20 kg/cm$^2$ | 20 kg/cm$^2$ |
| JIS hardness | 58° | 58° |
| Thickness of hard rubber band gauge d | 2.5 | 2.5 |
| 100% modulus | 75 kg/cm$^2$ | 75 kg/cm$^2$ |
| JIS hardness | 80° | 80° |
| Height of hard rubber $h_4$ | 80 | 70 |
| Thickness of strip rubber gauge t | 1.5 | 1.5 |
| 100% modulus | 50 kg/cm$^2$ | 50 kg/cm$^2$ |
| JIS hardness | 80° | 80° |

TABLE 2
(Prior Art)

| Structure | Tire Size 10.00R20 14 PR. Tube Tire (mm) | 12R22.5 14 PR. Tubeless Tire (mm) |
|---|---|---|
| Height $h_7$ at the tire portion of a maximum width | 137 | 114 |
| Height of upper end of turnup portion of ply $h_1$ | 45 | 30 |
| Height of metal cord reinforcement layer $h_2$ | 57 | 40 |
| Height of metal cord reinforcement layer $h_2'$ | 53 | 22 |
| 100% modulus | 50 kg/cm$^2$ | 50 kg/cm$^2$ |
| JIS hardness | 70° | 70° |
| Height of fiber cord reinforcement layer $h_3$ | 82 | 80 |
| 100% modulus | 30 kg/cm$^2$ | 30 kg/cm$^2$ |
| JIS hardness | 65° | 65° |
| Stiffener JIS hardness | 85° | — |
| Buffer JIS hardness | 60° | 60° |

TABLE 3

| Test Tires | Durability Index |
|---|---|
| The Invention | 210 |
| The Prior Art | 100 |

According to this invention, the vertical height $h_1$ of the upper end 2a of the turnup portion 2' of the carcass ply 2 from the bead base portion is preferably located at the range of 0.3–0.5 times as high as the vertical height $h_7$ from the bead base portion of the position at which the section width is at a maximum when the tire is inflated to the stipulated maximum internal pressure. When the height $h_1$ is less than 0.3 $h_7$, the rigidity of the bead section is lower and the resistance to rubber wear of the bead section, due to the friction with the rim, is also lower, and there is a risk of the carcass ply 2 slipping out of the bead core 3 because the turnup portion 2' is short in length and the bonding area with other surrounding components is therefore insufficient. On the contrary, when the height $h_1$ is more than 0.5 $h_7$, the upper end 2a of the turnup portion of the carcass ply 2 is exposed in the area of maximum tire section width at which the flexure is most severe, so the nucleus of a crack may generate at the upper end 2a of the turnup portion 2'. This may be because this is the point where the difference of rigidity is the largest in the bead section under load, and the upper end 2a is liable to be subjected to separation failure. Accordingly, the height $h_1$ of the turnup portion is preferred to be 0.3–0.5 times as high as the height $h_7$.

The above-mentioned fact was also confirmed by measuring the resistance to blowout behavior and the strain of cord ends in the laboratory.

At the same time, it is preferably that the height $h_2$ of the upper end 4a of the steel cord reinforcing layer 4 from the bead base is 0.5–0.9 times as high as the height $h_1$ of the upper end 2a of the turnup portion 2' of the carcass ply 2. The height of the upper end 4a in the radial direction of the steel cord reinforcing layer 4 in the bead structure of the conventional tires, as shown in FIG. 2, is higher than the height of the upper end 2a of the turnup portion 2' of the carcass ply 2. However, when bead failures occur at the position at which the upper end 4a of the steel cord reinforcing layer 4 is located, the applicants then studied the cause of the bead failure at this position and confirmed by many experiments that the upper end 4a of the steel cord reinforcing chafer 4 is likely to function as a resistant layer having a high bending rigidity to the transmission of deflection from the sidewall to the bead portion, which is repeated every revolution under load. As a result, the rubber around the cut end of each steel cord is broken down and caused to separate from the cord. Furthermore, the higher the position of the upper end 4a of the steel cord reinforcing layer, the earlier the separation between the cord end and the rubber occurs.

The applicants have found that by making the height $h_2$ of the upper end 4a of the steel cord reinforcing layer 4 lower, as much as possible, than the height $h_1$ (namely, $h_2$ is 0.5–0.9 times as high as the height $h_1$), the aforesaid failure in the bead section is greatly decreased. When the height $h_2$ is less than 0.5 $h_1$, the rigidity of the bead section is also lowered, and the resistance to wear of the bead section due to the friction with the rim and to the casing failure under severe load also lowers. On the contrary, when the height $h_2$ is in the range of a radial height of $(0.9–1.0)h_1$, both the upper end 2a and the upper end 4a are almost overlapped with each other and the stress concentration is doubled thereon. The result is that the trouble is generated earlier. Therefore, the range of the height $h_2$ of the upper end 2a of the steel cord reinforcing layer 4 is preferred to be 0.5–0.9 times as high as the height $h_1$. Furthermore, toward the upper side of the upper end 4a of the steel cord reinforcing layers 4, PF strips having a thickness (t) of 0.3–5 mm and a 100% modulus of elasticity of 30–80 kg/cm² is interposed between the turnup portion 2' of the carcass ply 2 and the organic fiber cord reinforcing layer 6 in order to alleviate the stress concentration at the upper end of steel cords, to reduce shearing strain among the layerss and to improve the cut resistance at the ends of steel cords.

Figure 1:
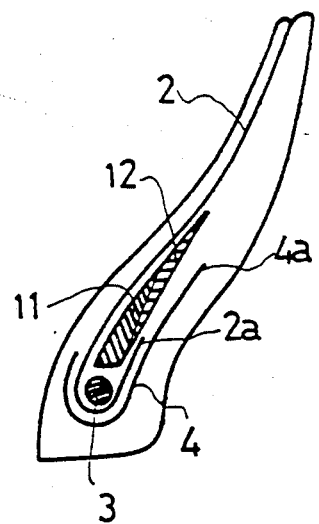
FIG. 1 is a cross-sectional view of a bead section of a prior art radial tire having a conventional bead portion reinforcing construction.

In usual tire construction, a bead apex, which is disposed between the carcass ply main portion 2 and its turnup portion 2', is formed of one integral rubber piece having at least the same hardness as that of carcass ply coating rubber or formed of a composite rubber layer composed of upper and lower halves 11,12, and the hardness of the upper half rubber is lower than that of the lower half rubber in the bead construction of the prior art, as shown in FIGS. 1 and 2.

To the contrary, the bead apex SE, according to the present invention as shown in FIG. 4, is composed preferably of one integral soft rubber piece having a lower hardness of 45°–65° than that of the carcass ply coating rubber and a 100% modulus of elasticity of 10–45 kg/cm². This leads to low energy consumption in order to make it easy to absorb the strain change produced at the cut ends of the carcass ply at the steel cord reinforcing layers and at the organic fiber cord reinforcing layers by every rotation under load. The heat regeneration in the bead portion is controlled as a result of adopting the above-mentioned bead construction. It has now beenn confirmed by applicants that the endurance of the bead portion is effectively improved.

The height $h_2'$ of the upper end 4b of the inner side portion 4' of the steel cord reinforcing layer 4, wound around the bead base at the inside of the axial direction of the bead core 3, is preferably 0.3–0.8 times as high as the height $h_1$ of the upper end 2a of the turnup portion 2' of the carcass ply 2.

When $h_2'$ is less than 0.3 $h_1$, the movement of the carcass ply around the bead core becomes large, and when it is higher than 0.8 $h_1$, the upper end 4b tends to be a nucleus of cracking in the bead portion. Accordingly, the height $h_2'$ is preferred to be 0.3–0.8 times as high as the height $h_1$. The above-mentioned fact was confirmed to be correct by a large number of bead endurance tests.

In order to prevent the cord path (the space between two adjacent ply cords) from expansion, which deforms the carcass ply over the rim flange like a convex surfacce toward an outside direction of a rotary axis of the tire, Rubber band HB, which has a thickness (d) of 2–5 mm and a 100% modulus of elasticity of 100–150 kg/cm² and JIS hardness of 70°–90°, is arranged with strong adhesion to the carcass ply in the outside of the carcass ply main portion with respect to the axial direction of the tire from the height $h_2'$ of the axially inside turnup portion 4' of the steel cord reinforcing layer 4 to the height $h_4$, which is 1.2–2.0 times as high as the height $h_1$ of the upper end 2a of the turnup portion 2' of the carcass ply 2. The higher the hardness and the thickness and the elasticity of the rubber band HB, the larger the effect to prevent the carcass ply from enlarging the cord path and to control the deflection of the carcass ply over the rim flange.

As described above, according to the present invention the durability of the bead section can be advantageously improved by effectively protecting the carcass ply and cut ends of the turned up portion of the carcass ply and of the steel cord reinforcing layer, which are difficult to adhere to rubber, with the hard rubber band HB and one integral soft rubber piece SE as a bead apex and filler edge strip PF.

What is claimed is:

1. A pneumatic radial tire having reinforced bead regions comprising:
   a pair of bead cores each having a radially outwardly facing surface and a carcass comprising at least one carcass ply of substantially radially extending rubber coated steel cords having ends which are wrapped around the bead cores from the inside toward the outside of the tire to form turnup portions extending to a perpendicular radial height $h_1$ above the bead cores;

a reinforcing layer of rubberized steel cords wrapped around the portion of the turnup on the bead cores, the axial outer edge of said layer extending to a perpendicular radial height $h_2$ above the bead cores, with $h_2$ being 0.9 to 0.5 times as high as $h_1$ and higher than the radial height of the wheel rim to which the tire is fitted;

at least one layer of rubberized organic fiber cord wrapped along and adjacent to the steel cord reinforcing layer, with the axial outer ends of said cords extending to a perpendicular radial height $h_3$ above the bead cores, with $h_3$ being 1.3 to 2.5 times as high as $h_1$ so as to cover the upper ends of both the steel cord reinforcing layer and the turnup portion;

a rubberized strip having a 100% modulus of elasticity of 30 to 80 kg/cm$^2$ and a thickness of 0.3 to 5 mm positioned and shaped to extend both above and below the carcass ply turnup end so as to overlie said turnup end and to contact the organic fiber cord reinforcing layer and to be in contact with the upper end of the steel cord reinforcing layer;

a bead apex strip of substantially triangular cross-sectional shape having its base substantially covering the radially outwardly facing surface of the bead core and extending radially outwardly from the bead core and interposed between the carcass ply and the carcass ply turnup, comprising an integral soft rubber piece having a JIS hardness of 45°–65° which is lower than that of the carcass ply coating rubber and a 100% modulus of elasticity of 10 to 45 kg/cm$^2$.

2. The tire of claim 1, in which the steel cord reinforcing layer has an axially inner edge extending to a perpendicular radial height $h_2'$ above the bead cores, with $h_2'$ being 0.3 to 0.8 times $h_1$.

3. The tire of claim 1, including a hard rubber band having a JIS hardness of 70°–90°, a 100% modulus of elasticity of 60 to 150 kg/cm$^2$ and a thickness of 2 to 6 mm is disposed between the main portion of the carcass and the bead apex strip at a perpendicular radial height of $h_4$ above the bead cores, with $h_4$ being 1.2 to 3.0 times $h_1$ or $h_2'$.

4. The tire of claim 1, in which the organic fiber cord wrapper comprises nylon cords.

5. The tire of claim 1, in which the organic fiber cord wrapper comprises a wholly aromatic polyamide.

* * * * *